(No Model.)
S. C. BAUCUM.
SULKY PLOW AND COTTON SCRAPER.
No. 257,914. Patented May 16, 1882.
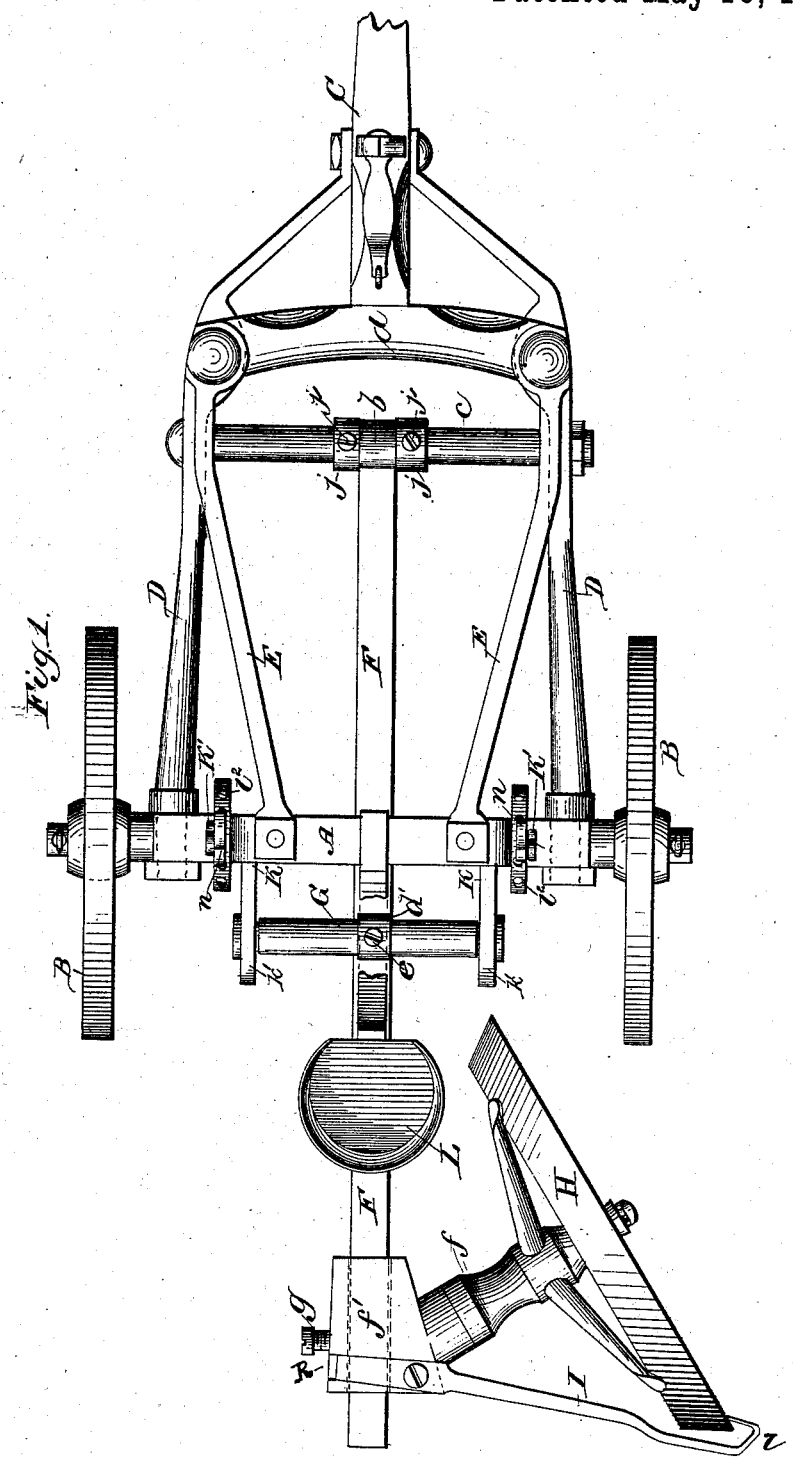

(No Model.) 2 Sheets—Sheet 2.
S. C. BAUCUM.
SULKY PLOW AND COTTON SCRAPER.
No. 257,914. Patented May 16, 1882.
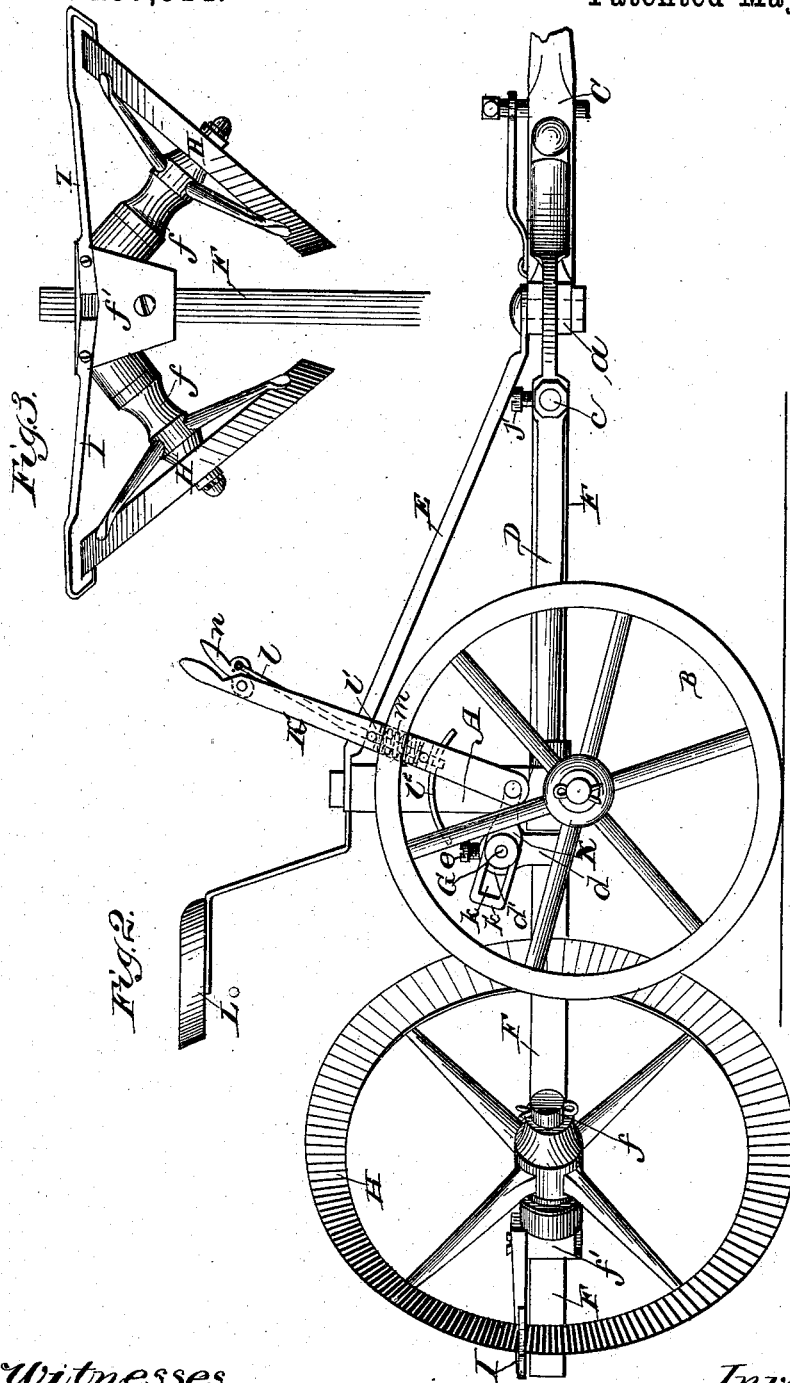
Witnesses.
Lou F. Chadwick
Jas. A. Baxter.
Inventor
Samuel C. Baucum
By Myers & Co
Attys

UNITED STATES PATENT OFFICE.

SAMUEL C. BAUCUM, OF WACO, TEXAS.

SULKY-PLOW AND COTTON-SCRAPER.

SPECIFICATION forming part of Letters Patent No. 257,914, dated May 16, 1882.

Application filed January 16, 1882. (No model.)

*To all whom it may concern:*

Be it known that I, SAMUEL C. BAUCUM, a citizen of the United States, residing at Waco, in the county of McLennan and State of Texas, have invented certain new and useful Improvements in Sulky-Plows and Cotton-Scrapers, of which the following is a specification, reference being had therein to the accompanying drawings, in which—

Figure 1 is a plan view, and Fig. 2 is a side view, of my improved sulky-plow. Fig. 3 is also a plan view of the same adapted as a cotton-scraper.

This invention relates to an improvement in sulky-plows, its object being to render the plow right or left hand for operation, to adjust the angle of presentation of the plow with relation to the line of draft, and to adapt the plow as a cotton-scraper; and it consists of the combination and arrangement of parts, substantially as hereinafter more fully set forth.

A represents an arched axle, on which are journaled the wheels B, the tongue being connected thereto by two hounds, D, bolted to the axle-arms and to the tongue cross-piece $a$. The tongue cross-piece $a$ is connected to the arch of the axle A by the braces or rods E, rigidly securing the axle in an upright position.

F is the plow-beam, having an eye, $b$, at its forward end adapted to fit and slide upon a rod or bar, $c$, bolted to the hounds D. The beam is hung about midway its length in an eye or support, $d$, having a second eye, $d'$, passing through it at right angles to the other eye, and through which the rod or bar G passes, and which eye $d'$ has a set or holding screw, $e$, by which it is screwed to bar G.

H is the rotary disk-plow, carried by an axle, $f$, cast with or attached at an acute angle to a bracket, $f'$, fitted to slide upon the beam F, and having a set or holding screw, $g$, to hold it at the required point of adjustment. The acute-angularly-arranged axle $f$ permits the similar arrangement of the rotary disk or plow H to the line of draft to enable it to form the furrow.

I is a knife or scraper, detachably secured to the axle-bracket of the plow, and having its outer end made in the shape of a hook, as at $i$, to enable its blade to stand contiguous to the inner concaved side of, and remove adhering dirt from, the plow. The handle of this knife or scraper is inserted and screwed in the recess R in the metallic bracket, as shown, as a means of additionally strengthening and securing it in position.

It will be observed that the axle-bracket can be readily slipped off the beam F, after loosening its screw, and be reversed so as to cause the axle and the plow to stand upon the opposite side of the beam, the detachable knife being adjusted to the opposite side of the bracket, also adapted for its convenient attachment thereto, and thus render the machine capable of use as a right or left hand plow.

Fitted upon the rod $c$, and arranged one upon each side of the plow-beam F, are two collars or bearings, $j$, having holding or adjusting screws $j'$. This arrangement permits the adjustment of the plow-beam at an oblique angle of greater or less inclination to the line of draft to accordingly adjust the plow, and thus allow of increasing or diminishing the width of the furrow.

The rod G, having the eye or support $d$, within which the plow-beam is hung, is itself supported in slots $k$ in the rearwardly-projecting arms $k'$ of shafts or axes K, bearing in apertures in the lower ends of the vertical portions of the axle A. These shafts or axes K are provided each with a lever, K', operated by hand, and having a detent, $l$, guided in an eye, $l'$, thereon, and adapted to enter any one of a series of perforations made in a segment, $l^2$, fixed to or cast upon the side of the vertical part of the axle A, to permit of the adjustment of the lever, so as to raise and lower the rod G to accordingly affect the beam and plow as occasion may require. The detent $l$ of each lever is provided with a spring, $m$, bearing upon a shoulder thereof and against an eye, $m'$, of the lever, through which the detent passes to effect the automatic engagement of the detent with the perforated segment $l^2$ and the holding of the lever as adjusted. The detent is eccentrically connected to a cam-lever, $n$, pivoted to the lever near its upper end, so as to be under the ready control of the operator. The purpose of the slots in the shaft-arms $k'$ is to allow the beam-supporting rod G to accommodate itself to the obliquity of the movement of the beam as it is adjusted, with the plow, to vary the width of the furrow. The driver's seat L is suitably mounted in place upon the elevated part of the axle A.

In Fig. 3 it will be seen that the axle-bracket $f'$ has two acute-angularly-arranged axles, one on each side, to permit of the simultaneous employment of two rotary disks or plows when it is desired to use the plow as a cotton-scraper, or for the cultivation of cotton. With such an arrangement it will not be necessary to reverse the axle-bracket to convert the machine into a right or left hand plow.

Having thus fully described my invention, I claim and desire to secure by Letters Patent—

1. The combination, with the beam F, having eye $b$, the bracket $f'$, and disk H, of the rod $c$, adjusting-collars $j$, rod G, support $d\ d'$, levers K, and slotted arms $k'$, all constructed and adapted to operate as described.

2. The combination, with the beam F, carrying disk H, of the rod $c$, collars $j$, rod G, support $d\ d'$, slotted arms $k'$, and independent levers K', substantially as described.

In testimony whereof I affix my signature in presence of two witnesses.

SAMUEL C. BAUCUM.

Witnesses:
FRANK L. McGREGOR,
CHARLES RIX ROBINSON.